United States Patent [19]

Wienert

[11] 4,178,349

[45] Dec. 11, 1979

[54] PROCESS FOR DRY REMOVAL OF SULFUR DIOXIDE FROM COMBUSTION GASES

[76] Inventor: Fritz O. Wienert, 394 Roosevelt Ave., Niagara Falls, N.Y. 14305

[21] Appl. No.: 830,918

[22] Filed: Sep. 6, 1977

Related U.S. Application Data

[63] Continuation of Ser. No. 700,717, Jun. 28, 1976, abandoned.

[51] Int. Cl.$^2$ .......................... C01B 17/00; B01J 8/00
[52] U.S. Cl. ..................................... 423/244; 110/345
[58] Field of Search ..................... 423/244, 242; 55/73; 110/343, 345

[56] References Cited

U.S. PATENT DOCUMENTS

| | | | |
|---|---|---|---|
| 2,718,453 | 9/1955 | Beckman | 423/244 |
| 3,708,266 | 1/1973 | Gustavsson | 423/242 |
| 3,851,042 | 11/1974 | Minnick | 423/244 |

FOREIGN PATENT DOCUMENTS

| | | | |
|---|---|---|---|
| 435560 | 9/1935 | United Kingdom | 423/244 |
| 878723 | 10/1961 | United Kingdom | 423/244 |

*Primary Examiner*—O. R. Vertiz
*Assistant Examiner*—Gregory A. Heller
*Attorney, Agent, or Firm*—Ashlan F. Harlan, Jr.

[57] ABSTRACT

Sulfur dioxide in the combustion gases from steam-generating systems is removed therefrom by mixing the gases in a reaction chamber, for a period of from 2 seconds to about 15 seconds with dry, finely divided, reactive, lime-bearing material, and then separating most of the reacted particles in a settling chamber. The reaction and settling chambers are located between the boiler and the economizer, between the economizer and the air preheater, or between the air preheater and the precipitator, with the gases being diverted through the chambers and then returned to their normal flow path. A portion of the reacted particles from the settling chamber are mixed and ground with fresh particles of lime-bearing material and recycled back through the reaction chamber, the mixture being heated, if desired, before being introduced into the latter.

11 Claims, No Drawings

PROCESS FOR DRY REMOVAL OF SULFUR DIOXIDE FROM COMBUSTION GASES

This application is a continuation of application Ser. No. 700,717, filed June 28, 1976, now abandoned.

BACKGROUND OF THE INVENTION

The combustion of most fossil fuels such as coal and oil results in the production of sulfur dioxide by oxidation of sulfur impurities in the fuel. The resultant sulfur dioxide when emitted from the stack into the atmosphere is very objectionable and, in most instances, illegal. Consequently, considerable attention has been paid to the problem of removing the sulfur dioxide from the combustion gases, particularly in large steam generating installations, such as those of the utility industry, where large quantities of such fuels are burned.

It is now well known to decrease the emission of sulfur dioxide into the atmosphere by scrubbing the combustion gases, before they pass into the stack, with aqueous solutions and suspensions of reagents which combine with the sulfur dioxide. Several of these known wet methods involve the regeneration of the reagent and the production of sulfur-containing products having a market value. However, the operational costs of such methods are high and the sale of the resultant sulfur-containing products in the available market at a reasonable price is a problem. Other wet methods for the purpose involve the use of aqueous suspensions of finely divided, lime-bearing materials such as limestone and calcium hydroxide. The disposal of the resulting reaction sludge, which contains calcium sulfite and calcium sulfate formed by reaction, constitutes a major problem.

All the scrubbing methods have the disadvantages that the treated combustion gases, having lost buoyancy, must be moved through the scrubber by a fan, which consumes much power, and must be reheated, with a considerable input of thermal energy, before the pass into the stack. Another drawback of most scrubbing methods is that incrustations on the equipment must be cleaned therefrom periodically.

There are also known so-called dry methods of adsorbing or reacting with sulfur dioxide in combustion gases in which the gases are not cooled and a more easily disposable dry, spent material is obtained. In some of these methods, fine particles of lime-bearing materials such as limestone, dolomite, marl, burnt lime and calcium hydroxide are injected into the boiler. It is to be understood that, for convenience here and hereinafter, reference to "the boiler" or "a boiler" should be construed as meaning the firebox used in heating such boiler and/or the flue immediately adjacent thereto. If ground or pulverized limestone is so injected, if must be initially decomposed to form CaO and CO$_2$. This decomposition requires a considerable amount of heat as shown by the equilibrium:

$$CaCO_3 \rightleftharpoons CaO + CO_2 - 42.5 \text{ kcal}$$

The CaO formed then reacts with sulfur dioxide, generating heat, according to the equation:

$$CaO + SO_2 + \tfrac{1}{2}O_2 = CaSO_4 + 119.7 \text{ kcal}$$

The overall reaction for the dry removal of SO$_2$ is represented by:

$$CaCO_3 + SO_2 + \tfrac{1}{2}O_2 = CaSO_4 + CO_2 + 77.06 \text{ kcal}$$

In practice, however, it has been found that only a minor part of the SO$_2$ can be removed from the combustion gases by this method, even when an excess of lime-bearing material is used, that fouling and plugging occur in the boiler, as well as in the economizer and in the air preheater normally used in such systems, and that the performance of the electric precipitator, also usually employed for the removal of fly ash, is degraded due to the presence of a large amount of partially reacted dust. The low efficiency of the prior art, dry sulfur dioxide removal has two inherent reasons. Firstly, a shell of calcium sulfate forms by reaction around the lime particles through which SO$_2$ cannot easily diffuse and the pores in the lime particles are clogged by the calcium sulfate. Consequently, not all of the CaO can be contacted by the SO$_2$. In the second place, the effective time permitted for reaction of the lime-bearing material particles and SO$_2$ is short, ranging from about 0.2 sec. to 2 sec. with usual boiler design. Matters are made even worse by the fact that the particles are usually not uniformly distributed in the combustion gases.

It has been found, as expected, that the reactivity of different lime-bearing materials varies. The least reactive is ground limestone. Calcined limestone (CaO) is more reactive and calcium hydroxide particles, which may have an average particle size of 0.2 micron, are still more reactive. Even when using the latter, however, only about 33% of the sulfur dioxide in the gases is removed in the use of known methods.

As indicated above, an excess of lime-bearing material is not able to increase substantially the efficiency of the processes just described and use of such an excess is not in general economically practical because of the increased cost of the lime-bearing material, the added dust problems in the boiler, economizer, air preheater, and electric precipitator, and because of the increased cost of disposing of the reacted material.

SUMMARY OF THE INVENTION

All the disadvantages associated with the prior art in which fine particles of lime-bearing materials are injected into the combustion gases in the boiler are either ameliorated or overcome by the present invention which has as its principal objectives to increase both the degree of sulfur dioxide removal and of the utilization of the lime-bearing material reacting with SO$_2$. Other benefits will become apparent in the course of the description.

The above-mentioned objectives are achieved by conducting the combustion gases, before they reach the electrostatic precipitator normally used, through a reaction chamber in which the gases are treated, and then through a settling chamber in which a major portion of the suspended solid material is removed. The process involves mixing the gases in the reaction chamber with dry, finely divided, reactive, lime-bearing material for a relatively extended period of time and separation of most of the reacted particles in the settling chamber. A portion of the recovered reacted particles preferably are ground and recycled through the reaction chamber with fresh particles of lime-bearing material. The combustion gases passing from the settling chamber continue their normal flow through the system. The reaction and settling chambers, which are of relatively large cross-section so as to decrease the velocity of the gases therein and permit an increased time for reaction, can be located between the boiler and the economizer, between the economizer and the air preheater, or between the latter and the precipitator. The location will depend, as explained below, on the design of the system and other factors.

By "lime-bearing material", as used herein, is meant a material which comprises free CaO and/or a calcium compound that decomposes when heated to form free CaO.

THE INVENTION

In carrying out the present invention, the combustion gases from a steam-generating boiler are well and continuously mixed in the reaction chamber with fine particles of reactive lime-bearing materials in such an amount that the ratio of calcium oxide is at least stoichiometrically 1:1 with the $SO_2$ content in the gases, and is preferably higher. The duration of the mixing, which obviously depends on the volume of the reaction chamber, may range from between 2 and 3 seconds to about 15 seconds. A mixing time near the upper end of the range is preferred, but mixing for longer than 15 seconds is proportionally less effective and is, in general, not practical. From the reaction chamber gases with entrained solid particles are conducted to the settling chamber in which the major part of the solid particles are removed. The roughly cleaned combustion gases from the settling chamber then continue their normal flow to the stack.

The mixing of gases and solid particles in the reaction chamber can be achieved in various ways. The solid particles can be kept in suspension by turbulence of the gas caused by the shape of the reaction chamber, by baffles in the chamber, by mechanical agitation, or pneumatically, by injecting gas into the chamber through nozzles. If desired, combinations of these procedures may be used. As is indicated above, the construction of the reaction chamber and the settling chamber is not critical and any suitable designs and/or constructions may be used.

A portion of the solid particles that are retained in the settling chamber is preferably ground and recycled to the reaction chamber with particles of fresh lime-bearing material. All or a portion of any solid particles that are not entrained in the gas flow but settle in the reaction chamber can also be ground and recycled. Particles from the reaction chamber and/or the settling chamber that are not so recycled may be disposed of as waste.

By thus grinding the settled particles, the reactivity of the particles is renewed, apparently because the calcium sulfate formed, by reaction, as shells on the particle surfaces and in the pores of the particles is cracked and broken up by the grinding. As mentioned above, such calcium sulfate hinders diffusion of $SO_2$ into the particles. Furthermore, the grinding breaks up aggregates which form easily from fine particles, especially of burnt lime and calcium hydroxide. Such aggregates are at least partially converted by reaction to calcium sulfate, predominantly on and adjacent their outer surfaces. Unreacted material in the interiors of the aggregates becomes accessible, however, to the sulfur dioxide in the gases when the ground material is returned to the reaction chamber. The return of ground aggregates and particles to the reaction chamber is important as it increases the total reactivity of the lime-bearing material in the reaction chamber, thus also increasing the degree of the sulfur dioxide removal and the extent of lime utilization.

Apart from the fact that some types of fly ash are able to react with or adsorb sulfur dioxide, fly ash present in the combustion gases plays a beneficial role in the novel method of this invention. Such fly ash as is collected in the settling chamber with partially reacted lime-bearing material will tend to adhere to particles of the latter. Consequently, when very fine particles of the latter form aggregates, such aggregates have a lattice of ash particles which permits access of sulfur dioxide into the interior for further reaction with the lime-bearing material. If desired, fly ash from any suitable source can be added to the reaction chamber in proportions similar to those normally occurring in combustion gases.

In many instances it will be found desirable to segregate the particles of reacted lime-bearing material in the settling chamber according to their settling rates. This permits the selection for grinding and return to the reaction chamber of that portion of the particles which has the highest average content of reactive lime after grinding. Such portion is not necessarily the portion having the highest total CaO content, since the CaO that has been reacted with $SO_2$ or that which remains enclosed in calcium sulfate, even after grinding, is not reactive. Since the amount of reactive lime in the particles after grinding depends on the physical characteristics of the original fresh lime material, on the type of mill used for grinding, and on the extent of grinding, the fraction having the highest content of reactive lime must be determined in each instance.

Preferably, the part of the settled solids selected for recycling by return to the reaction chamber is ground together with the fresh fine particles of lime-bearing material being added before the mixture is fed into the reaction chamber. This joint grinding comminutes the fresh material further and disperses the superfines present among the ground particles of the settled solids, thereby tending to form, by adhesion, soft aggregates having pores large enough to allow the passage of sulfur dioxide into the interiors of the aggregates. Thus, the reactivity of the resulting aggregates is high. After the reaction, the aggregates settle rather quickly. On the other hand, superfines do not settle easily and pass on into the electrostatic precipitator. To avoid overloading the precipitator, the aggregation of the superfines must, therefore, be encouraged. It is preferred to grind the mixture of fresh and partly spent lime-bearing material in a ball mill although other grinding procedures may be used.

When the dust precipitated electrostatically from the flue gases has a sufficient content of reactive lime, a part of such dust can also be recycled by adding it to and grinding it with the portion of the settled, partially reacted, lime-bearing particles from the settling chamber and reaction chamber that is recycled. In this manner, the fine dust is made to adhere to and to aggregate with the partially reacted particles. In the reaction chamber the aggregates become firmer and heavier by the formation of calcium sulfate and subsequently settle more easily. Thus, the original superfine dust from the precipitator is converted to a coarser powder which can be more easily disposed of.

For introduction into the reaction chamber, according to the present invention, the combustion gases can be withdrawn at any of three different points in their normal flow path from the boiler through the customary economizer and air preheater. After passage through the reaction chamber and the settling chamber the withdrawn gases are preferably returned to the system at a point immediately following the point of withdrawal. The possible points of withdrawal are: (1) between the boiler and the economizer, (2) between the economizer and the air preheater, and (3) between the air preheater and the precipitator. As set out below, each of these points has both advantages and disadvantages. At which point the combustion gases are withdrawn will be determined in each installation by the economic availability of different sources of lime-bearing material, the physical construction of the installation, and the permissible $SO_2$ content of the effluent gases from the installation.

Combustion gases withdrawn from the system between the boiler and the economizer are quite hot, having a temperature of about 2000° F. (1190° C.), and because of their temperature have a relatively low density. Accordingly, carrying out the invention with such gases requires relatively large reaction chambers, settling chambers and ducts. Further, the high temperature of the gases necessitates heavy insulation to prevent heat losses, and grinding of hot material from the settling chamber is more difficult. On the other hand, the high-temperature gases permit the use of inexpensive gound limestone as the lime-bearing material since it will be dissociated thereby to form CaO, which is quite reactive.

Combustion gases withdrawn from the system between the economizer and the air preheater have a temperature of about 600° F. (316° C.), which precludes the use of limestone for the lime-bearing material. The more expensive CaO or $Ca(OH)_2$ must be used instead. These, however, are more reactive and hence require a smaller reaction chamber. The lower gas temperature and resultant increase in its density also permit the use of apparatus of smaller capacity.

When the combustion gases are withdrawn from their normal path between the air preheater and the dust precipitator, they have a temperature of only about 300° F. (150° C.). At such a low temperature a very reactive form of CaO must be present for the reaction with $SO_2$ to take place quickly. Such a reactive form can be obtained by the dehydration of calcium hydroxide to calcium oxide at a relatively low temperature. It will be understood that when combustion gases are withdrawn at a point where they are at a relatively low temperature they may be heated before entering the reaction chamber to increase the speed of the reactions therein. This can conveniently be done by adding a slip stream of gases having a higher temperature to the gases entering the reaction chamber, or by other suitable means.

Improved results are also obtained, particularly in those cases where the combustion gases are diverted to a reaction chamber from a point between the air preheater and the dust precipitator, by heating the lime-bearing material before it is fed into the reaction chamber. Such heating, which can be achieved in any desired manner, e.g. with a small volume of hot combustion gases, results in the rapid dehydration of calcium hydroxide to a very reaction form of CaO.

In an experiment simulating the treatment of combustion gases according to the present invention, it was found that about 90% of the $SO_2$ originally present in the gases were removed. In the experiment 410 parts of calcium hydroxide passing a 325 mesh Tyler screen and containing 72.62% CaO was ground with 486 parts of a similar calcium hydroxide that had been partially reacted with $SO_2$ and contained 30.4% free CaO. The ground mixture was heated to about 320° C. and introduced into a horizontal stainless steel cylinder provided with internal agitators. The cylinder, which represented the reaction chamber, was heated to 320° C., and had previously been filled with combustion gases having a 2.5vol% $SO_2$ content. By calculation, this amounted to 339 parts of $SO_2$. The ground mixture of lime-bearing material was agitated in the cylinder for 10 seconds and was then allowed to settle for 15 seconds. Analysis of the gas phase then showed only about 34 parts of $SO_2$ remaining, i.e. about 90% was removed by reaction, and analysis of the settled particles showed 178 parts of free CaO remaining. This is about 40% of the total free CaO introduced, so the utilization of the lime was about 60%.

The results obtained in the above-described experiment contrast sharply with a similar experiment in which only calcium hydroxide, containing the same amount of free CaO, was used and the agitation was carried on for only 2 seconds. Analysis of the residual gas phase in that experiment showed that only about 15% of the $SO_2$ was removed by reaction and it was found that only about 10% of the CaO was used for $SO_2$ removal.

It should be noted that $SO_3$ is formed in combustion gases by oxidation of $SO_2$. The amount of $SO_3$ thus formed is very small, however, and may be disregarded in carrying out the present invention. In any event, the $SO_3$ will tend to react with free CaO to form $CaSO_4$.

It will be understood that the invention is not limited to the precise procedure herein described, but should be interpreted as broadly as permitted by the appended claims.

In the foregoing description and the appended claims, parts and percentages are by weight except as otherwise indicated.

I claim:

1. In a process for removing sulfur dioxide from combustion gases of a steam-generating system that comprises a boiler, an economizer, an air preheater, a precipitator, and a stack, by reaction of the sulfur dioxide with dry particles of reactive lime-bearing materials, the improvement comprising: diverting the said combustion gases containing $SO_2$, prior to their passing said precipitator, from their normal flow path to a reaction chamber, retaining said gases in said reaction chamber with fine particles of dry reactive, lime-bearing materials for a reaction time longer than 2 seconds and not exceeding about 15 seconds while well and continuously mechanically agitating said gases and said particles whereby to maintain said particles in suspension, then passing said gases with said suspended particles from said reaction chamber to a settling chamber wherein the major portion of the solid particles are removed from the gases, said fine particles of dry, reactive lime-bearing materials comprising a product containing aggregates of fine particles obtained by grinding together a dry mixture of fresh, fine, reactive lime-bearing material and solid particles removed from said gases in said settling chamber, and then passing the said gases back into said normal flow path.

2. A process as set forth in claim 1 in which the grinding of said product is carried out in the presence of fine particles of fly ash.

3. A process as set forth in claim 1 wherein said fine particles are heated, after grinding, to a temperature higher than is required for the dehydration of calcium hydroxide before agitation with said gases.

4. A process set forth in claim 1 wherein said solid particles ground with said fresh, reactive lime-bearing material and agitated with said gases are those having the highest content of reactive CaO after grinding.

5. A process as set forth in claim 1 wherein a portion of the particles removed from the gases by the precipitator is ground with said solid particles.

6. A process as set forth in claim 1 wherein said reaction time is at least about 5 seconds.

7. A process as set forth in claim 6 wherein said fine particles are heated, after grinding, to a temperature higher than is required for the dehydration of calcium hydroxide before agitation with said gases.

8. A process as set forth in claim 6 wherein said solid particles ground with said fresh, reactive lime-bearing material and agitated with said gases are those having the highest content of reactive CaO after grinding.

9. A process as set forth in claim 6 wherein a portion of the particles removed from the gases by the precipitator is ground with said solid particles.

10. A process as set forth in claim 9 wherein said solid particles ground with said fresh, reactive lime-bearing material and agitated with said gases are those having the highest content of reactive CaO after grinding.

11. A process as set forth in claim 6 in which the grinding of said product is carried out in the presence of fine particles of fly ash.

* * * * *